United States Patent
Kim et al.

(10) Patent No.: US 9,400,852 B2
(45) Date of Patent: Jul. 26, 2016

(54) COMMUNICATION METHOD OF CONTENT REQUESTER, INTERMEDIATE NODE, AND CONTENT OWNER IN CONTENT CENTRIC NETWORK

(75) Inventors: Jae Hoon Kim, Yongin-si (KR); Myeong Wuk Jang, Seoul (KR); Ji Hoon Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 13/546,080

(22) Filed: Jul. 11, 2012

(65) Prior Publication Data
US 2013/0018937 A1 Jan. 17, 2013

(30) Foreign Application Priority Data
Jul. 12, 2011 (KR) .................. 10-2011-0069016

(51) Int. Cl.
| | | |
|---|---|---|
| G06F 17/30 | (2006.01) | |
| H04L 29/08 | (2006.01) | |
| G06F 15/16 | (2006.01) | |
| H04L 29/06 | (2006.01) | |

(52) U.S. Cl.
CPC ........ *G06F 17/30902* (2013.01); *H04L 67/288* (2013.01); *H04L 67/2842* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 5,924,116 A | * | 7/1999 | Aggarwal et al. | 711/122 |
| 6,006,264 A | * | 12/1999 | Colby et al. | 709/226 |
| 6,745,243 B2 | * | 6/2004 | Squire et al. | 709/227 |
| 7,269,169 B1 | * | 9/2007 | Venkataraman et al. | 370/389 |
| 2003/0079027 A1 | | 4/2003 | Slocombe et al. | |
| 2003/0088699 A1 | * | 5/2003 | Luciani et al. | 709/243 |
| 2003/0105925 A1 | | 6/2003 | Yoshimura et al. | |
| 2004/0103437 A1 | | 5/2004 | Allegrezza et al. | |
| 2005/0216559 A1 | | 9/2005 | Manion et al. | |
| 2008/0010381 A1 | * | 1/2008 | Barraclough et al. | 709/228 |
| 2009/0287835 A1 | | 11/2009 | Jacobson | |
| 2009/0288163 A1 | | 11/2009 | Jacobson et al. | |

(Continued)

FOREIGN PATENT DOCUMENTS

KR 10-2007-0105487 A 10/2007

OTHER PUBLICATIONS

Lee, Jihoon, and Daeyoub Kim. "Proxy-assisted content sharing using content centric networking (CCN) for resource-limited mobile consumer devices." Consumer Electronics, IEEE Transactions on 57.2 (2011): 477-483.*

(Continued)

*Primary Examiner* — Scott B Christensen
*Assistant Examiner* — Sean Concannon
(74) *Attorney, Agent, or Firm* — NSIP Law

(57) ABSTRACT

Communication method of a content requester, an intermediate node of one or more intermediate nodes, and a content owner in a content centric network are provided. A communication method of a content requester in a content centric network (CCN) includes, where the CCN includes the content requester, one or more intermediate nodes, and a content owner, generating a content request packet including a cache token, the cache token being used to determine one or more of the intermediate nodes in which to store content requested from the content owner, and transmitting the generated content request packet to the intermediate nodes and the content owner.

21 Claims, 5 Drawing Sheets

(56) References Cited

U.S. PATENT DOCUMENTS

| | | | |
|---|---|---|---|
| 2010/0195653 A1 | 8/2010 | Jacobson et al. | |
| 2010/0195654 A1 | 8/2010 | Jacobson et al. | |
| 2010/0195655 A1 | 8/2010 | Jacobson et al. | |
| 2010/0205213 A1* | 8/2010 | Broder et al. | 707/780 |
| 2010/0312861 A1 | 12/2010 | Kolhi et al. | |
| 2011/0019669 A1* | 1/2011 | Ma et al. | 370/389 |
| 2011/0310864 A1* | 12/2011 | Gage | 370/338 |
| 2012/0297088 A1* | 11/2012 | Wang et al. | 709/238 |

OTHER PUBLICATIONS

Vasserman, Eugene, et al. "Membership-concealing overlay networks." Proceedings of the 16th ACM conference on Computer and communications security. ACM, 2009.*

Le Roux, J. L., and J. P. Vasseur. "IGP Routing Protocol Extensions for Discovery of Traffic Engineering Node Capabilities." (2007).*

McDonald, A. Bruce, and Taieb F. Znati. "A mobility-based framework for adaptive clustering in wireless ad hoc networks." Selected Areas in Communications, IEEE Journal on 17.8 (1999): 1466-1487.*

Ogier, Richard G., Vladislav Rutenburg, and Nachum Shacham. "Distributed algorithms for computing shortest pairs of disjoint paths." Information Theory, IEEE Transactions on 39.2 (1993): 443-455.*

Hofmann, Markus, and A. Beck. IRML: A Rule Specification Language for Intermediary Services. Internet Draft, Internet Engineering Task Force, 2001.*

Katsaros, Konstantinos V. An information-centric overlay network architecture for content distribution and mobility support. Diss. Athens University of Economics and Business, 2010.*

Kim, Jaehoon, et al., "Content Centric Network-based Virtual Private Community ," 2011 IEEE International Conference on Consumer Electronics, pp. 843-844.

* cited by examiner

| Content Prefix 510 | Segment 520 |
|---|---|
| /naver.com/news/earthquake | 0 |
| Cache token 530 | Capability Bit 540 |
| 1(Increase or decrease at intermediate node) | 0000 1 0000 1 0000 1 0000 |

COMMUNICATION METHOD OF CONTENT REQUESTER, INTERMEDIATE NODE, AND CONTENT OWNER IN CONTENT CENTRIC NETWORK

CROSS-REFERENCE TO RELATED APPLICATIONS

This application claims the benefit under 35 U.S.C. §119(a) of Korean Patent Application No. 10-2011-0069016, filed on Jul. 12, 2011, in the Korean Intellectual Property Office, the entire disclosure of which is incorporated herein by reference for all purposes.

BACKGROUND

1. Field

The following description relates to a communication method of a content requester, an intermediate node, and a content owner in a content centric network (CCN).

2. Description of Related Art

Unlike an Internet protocol (IP) that records addresses of a source and a destination in a packet header, a content centric network (CCN) stores a name of desired content in a packet header. Each router in the CCN constructs a routing table with reference to a name of desired content stored in a packet header. The routing table is used to send each content request packet to a location where corresponding content can be found. All network equipment, including a router, may have storage and, thus, may temporarily store content.

Unlike an IP based Internet, in which content may be obtained from an original owner, any intermediate node in a CCN having corresponding content in storage may replay the corresponding content to a content requester. Thus, a CCN promotes transmission paths that are, on average, relatively short. As a result, a CCN may serve to reduce an overall amount of network usage.

However, in a CCN, corresponding content is stored in all available network equipment positioned on a route through which content is delivered after a content request packet is transmitted. For example, the same content can be updated consistently and repeatedly in storage of all network equipment positioned on the route. The route could conceivably include all of the network equipment in a network, thereby requiring repeated and consistent updates of all the storage of a network. This promotes the possibility of inefficient resource use in the network.

For example, certain storage elements of a network may not need updating at a particular point in time. However, in the CCN of the related art, a needs analysis is not performed. Thus, updating is performed without any consideration of an updating need. In addition, a period during which content is stored may be short in comparison with available network resources. Further, since all network equipment may include the same content, an intermediate node excluding the corresponding content may not respond to a content request packet quickly enough to prevent the content request packet from arriving at an original server.

Accordingly, there is a desire for a communication method that manages network resources effectively. For example, there is a desire for a communication method that manages the storing of content in the CCN effectively while content is being simultaneously delivered.

SUMMARY

In one general aspect, there is provided a communication method of a content requester in a content centric network (CCN), the CCN including the content requester, one or more intermediate nodes, and a content owner, the communication method including generating a content request packet including a cache token, the cache token being used to determine one or more of the intermediate nodes in which to store content requested from the content owner, and transmitting the generated content request packet to the intermediate nodes and the content owner.

The general aspect of the communication method of the content requester may further provide that the cache token is used by the content owner to determine the one or more of the intermediate nodes in which to store the content requested from the content owner.

The general aspect of the communication method of the content requester may further provide that the content request packet further includes a capability bit indicating whether the intermediate nodes are capable of storing the content.

The general aspect of the communication method of the content requester may further provide initializing a value of the cache token in the generated content request packet.

In another general aspect, there is provided a communication method of an intermediate node of one or more intermediate nodes in a content centric network (CCN), the CCN including a content requester, the intermediate nodes, and a content owner, the communication method including receiving, from the content owner, a content delivery packet including content requested by the content requester and a cache token, the cache token being used to determine one or more of the intermediate nodes in which to store the content, determining whether a value of the cache token of the received content delivery packet equals a value of a cache token corresponding to the intermediate node, and storing the content in the intermediate node based on a result of the determining.

The general aspect of the communication method of the intermediate node of the one or more intermediate nodes may further provide that, when the value of the cache token of the received content delivery packet is determined to be equal to the value of the cache token corresponding to the intermediate node, the intermediate nodes stores the content, and, when the value of the cache token of the received content delivery packet is determined not to be equal to the value of the cache token corresponding to the intermediate node, the intermediate node transmits the content to a subsequent one of the intermediate nodes or the content requester.

The general aspect of the communication method of the intermediate node of the one or more intermediate nodes may further provide receiving a content request packet from the content requester, and issuing the cache token corresponding to the intermediate node, the issuing of the cache token including changing a value of a cache token of the content request packet.

The general aspect of the communication method of the intermediate node of the one or more intermediate nodes may further provide that the content request packet includes the cache token of the content request packet, a name of the content, a segment of the content, and a capability bit indicating whether the one or more of the intermediate nodes are capable of storing the content.

The general aspect of the communication method of the intermediate node of the one or more intermediate nodes may further provide marking the capability bit.

The general aspect of the communication method of the intermediate node of the one or more intermediate nodes may further provide that the capability bit is marked at a location corresponding to the intermediate node starting from a highest bit level or a lowest bit level of the capability bit.

The general aspect of the communication method of the intermediate node of the one or more intermediate nodes may further provide that the capability bit is marked based on a frequency of the content and storage space of the intermediate node.

The general aspect of the communication method of the intermediate node of the one or more intermediate nodes may further provide that the capability bit is marked based on whether an adjacent node of the intermediate node marks the capability bit.

The general aspect of the communication method of the intermediate node of the one or more intermediate nodes may further provide delivering the content request packet having the marked capability bit to an other one of the intermediate nodes or the content owner.

In yet another general aspect, there is provided a communication method of a content owner in a content centric network (CCN), the CCN including a content requester, one or more intermediate nodes, and the content owner, the communication method including receiving a content request packet including a name of content requested by the content requester, determining one of the intermediate nodes to store the requested content, and transmitting, to the content requester and the one of the intermediate nodes, a content delivery packet, the content delivery packet including the requested content, and a cache token used to determine the one of the intermediate nodes to store the content.

The general aspect of the communication method of the content owner may further provide that the content request packet includes a cache token of the content request packet to determine one or more of the intermediate nodes to store the content, a segment of the content, a capability bit indicating whether the one or more of the intermediate nodes are capable of storing the content, or any combination thereof.

The general aspect of the communication method of the content owner may further provide setting a value of the cache token used to determine the one of the intermediate nodes to store the requested content, a number of cache tokens, or a combination thereof.

The general aspect of the communication method of the content owner may further provide that the one of the intermediate notes to store the requested content is determined based on a capability bit of the content request packet.

The general aspect of the communication method of the content owner may further provide that one of the intermediate notes to store the requested content is determined based on a value of the cache token of the content request packet.

The general aspect of the communication method of the content owner may further provide that the determining comprises identifying an intermediate node adjacent to the content requester based on a value of the cache token of in the content request packet, and determining the intermediate node adjacent to the content requester to be the one of the intermediate nodes to store the requested content.

The general aspect of the communication method of the content owner may further provide that the one of the intermediate nodes to store the requested content is determined based on a network route through which the content request packet is transmitted, a characteristic of the content, a size of the content, a frequency of the content being requested, storage space of the intermediate nodes, or any combination thereof.

The general aspect of the communication method of the content owner may further provide that, when the content requester or the one of the intermediate nodes includes a plurality of network routes, the one of the intermediate nodes to store the requested content is determined based on a characteristic of the requested content.

The general aspect of the communication method of the content owner may further provide that, when the content requester or the one of the intermediate nodes includes a plurality of network routes, the one of the intermediate nodes to store the requested content is determined based on a network route through which the content request packet is transmitted such that the one of the intermediate nodes is on a network route that is different from the network route through which the content request packet is transmitted.

In still another general aspect, there is provided a non-transitory computer-readable medium including a program for instructing a computer to perform the communication method of a content requester in a content centric network (CCN).

Other features and aspects will be apparent from the following detailed description, the drawings, and the claims.

Figure 1:
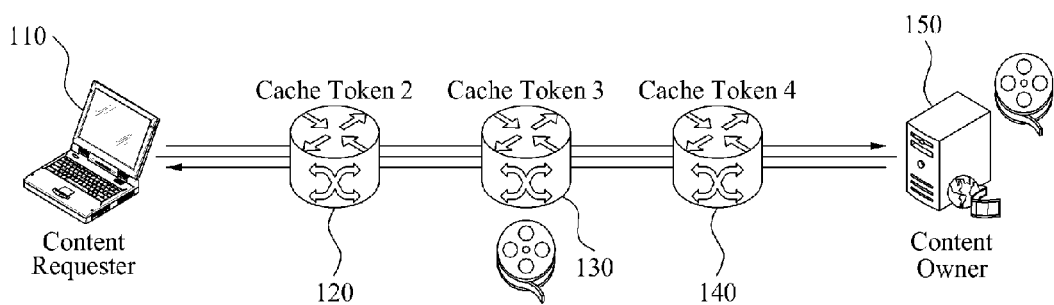
FIG. 1 is a diagram illustrating an example of a method of adaptively storing content using a cache token in a content centric network (CCN).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. In addition, description of well-known functions and constructions may be omitted for increased clarity and conciseness.

In examples described herein, each constituent of network equipment positioned on a route through which content is delivered in a content centric network (CCN) store content requested from a content requester and share content, relatively simply, based on a name of stored content.

In the CCN, a content requester transmits a content request packet that is of interest to a content owner. In response, the content owner receiving the content request packet transmits, to the content requester, a content transmission packet including requested content. When the content transmission packet including the requested content is transmitted, intermediate nodes deliver the requested content using a route through which the content request packet was received. As a result, the intermediate nodes temporarily store requested content in a local storage space.

Thus, when multiple content requesters transmit content request packets, a relatively large amount of identical content is stored in intermediate nodes on a network route. In this instance, the intermediate nodes on the network route may predominantly store new content.

FIG. 1 is a diagram illustrating an example of a method of adaptively storing content using a cache token in a CCN. Referring to the example illustrated in FIG. 1, the CCN includes a content requester 110, one or more intermediate nodes, such as, for example, an intermediate node 120, an intermediate node 130, and an intermediate node 140, and a content owner 150.

In the example illustrated in FIG. 1, packets routed by the CCN include a content request packet and a content delivery packet. The content request packet is of interest to a content owner 150, and includes a name of content requested by the content requester 110. The content delivery packet includes content that the content requester 110 requested from the content owner 150, a name of the requested content, and the like.

In response to the content request packet received from the content requester 110, the intermediate nodes 120, 130, and 140 may respectively search local storage according to a content name stored in a header of the content request packet. When the intermediate nodes 120, 130, and 140 respectively find the corresponding content in the local storage, the intermediate nodes 120, 130, and 140 deliver the corresponding content to the content requester 110. The content requester 110, the intermediate nodes 120, 130, and 140, and the content owner 150 included in the CCN may correspond to network equipment, such as, for example, a terminal, a router, an access point, or the like.

According to the example illustrated in FIG. 1, each of the intermediate nodes 120, 130, and 140 in the CCN issues a respective cache token. The content owner 150 issues a cache token to determine a node with which to store content when transmitting content. Thus, an intermediate node 120, 130, or 140 having a value of the cache token that is equal to a value of the cache token issued by the content owner 150 stores the content in its respective local storage.

The content requester 110 initializes a cache token and a content name when generating a content request packet. An initial value of the cache token may be set to a predetermined value when issuing the cache token, or may start from a predetermined value. For example, referring to FIG. 1, it may be presumed that a predetermined initial value of a cache token is "1." The content requester 110 may initialize a cache token to "1" when generating a content request packet. Thereafter, the intermediate node 120 receiving the content request packet from the content requester 110 may issue a cache token corresponding to the intermediate node 120 by changing a value of a cache token included in the content request packet to a value greater than "1" (here, the value corresponds to "2"). In this instance, an amount by which the value in the cache token is increased may be determined based on a policy set in a CCN system, or may be predetermined between entities, such as, for example, the content requester 110, the intermediate nodes 120, 130, and 140, and the content owner 150 in the CCN system.

Similarly, the intermediate node 120 and the intermediate node 130 may transmit the content request packet to a subsequent adjacent intermediate node or the content owner 150.

The content owner 150 receiving the content request packet determines a location to store content by measuring a network route. In this instance, the content owner 150 determines the location to store content based on a characteristic (or type) of content, a size of content, a frequency of requesting the corresponding content, storage space of intermediate nodes, and the like.

For example, as illustrated in FIG. 1, the content owner 150 enables the intermediate node 130 having "3" as a value of a cache token to store the corresponding content. In this instance, the content owner 150 sets a value of a cache token to "3" in a content delivery packet. The intermediate nodes 120, 130, and 140 receiving the content delivery packet determines whether the value, which is set to "3," of the cache token included in the content delivery packet coincides with a value of a cache token issued by the intermediate nodes 120, 130, and 140. In this instance, since a value, that is, "3" of the cache token issued by the intermediate node 130 is equal to the value, that is, "3" of the cache token included in the content delivery packet, the intermediate node 130 stores the corresponding content in local storage.

The content owner 150 may store content dispersedly at appropriate locations on a network route by adjusting a number of cache tokens according to various circumstances. For example, in response to the content owner 150 issuing two cache tokens, for example, "2" and "3," intermediate nodes 120 and 130, which respectively have "2" and "3" as values of a cache token, locally store the corresponding content. Prior to a reception of the content delivery packet, the intermediate nodes 120 and 130 having "2" and "3" as a value of a cache token, respectively, may inform the content owner 150, using a capability bit, that there is a high frequency of the corresponding content being requested, or that storage space is sufficient. The capability bit is included in the content request packet being transmitted to content owner 150, along with a cache token.

Figure 2:
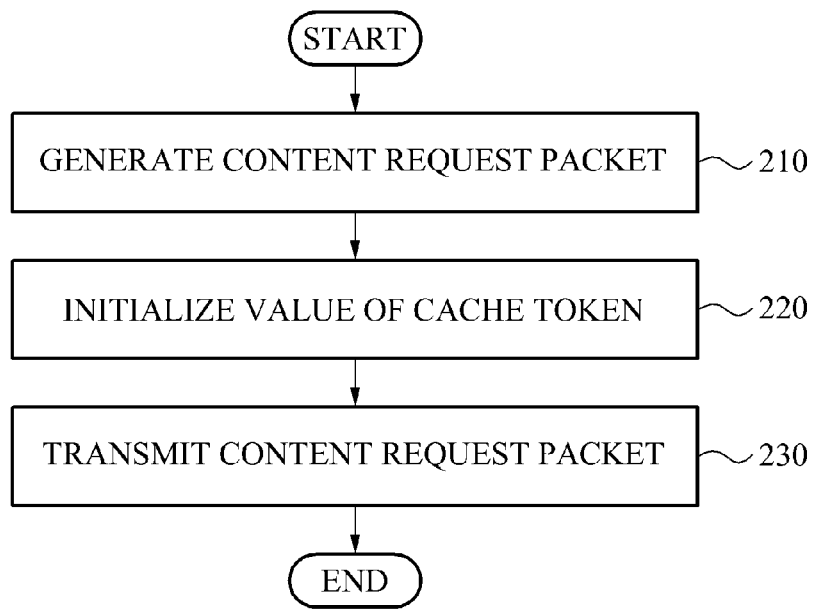
FIG. 2 is a flowchart illustrating an example of a communication method of a content requester in a CCN.

FIG. 2 is a flowchart illustrating an example of a communication method of a content requester in a CCN, the CCN including the content requester, one or more intermediate nodes, and a content owner. The CCN includes the content requester, one or more intermediate nodes, and a content owner.

Referring to FIG. 2, the content requester generates (210) a content request packet including a cache token. The cache token is used to determine content requested by the content requester and one or more of the intermediate nodes in which to store content that the content requester requests from the content owner. For example, the cache token may be used by the content owner to determine the one or more of the intermediate nodes in which to store the content requested from the content owner. The content request packet may further include a capability bit indicating whether the intermediate nodes are capable of storing the content. A configuration of the content request packet will be further described with reference to FIG. 5.

The content requester initializes (220) a value of the cache token included in the generated content request packet. The content requester transmits (230) the generated content request packet to the intermediate nodes and the content owner.

Figure 3:
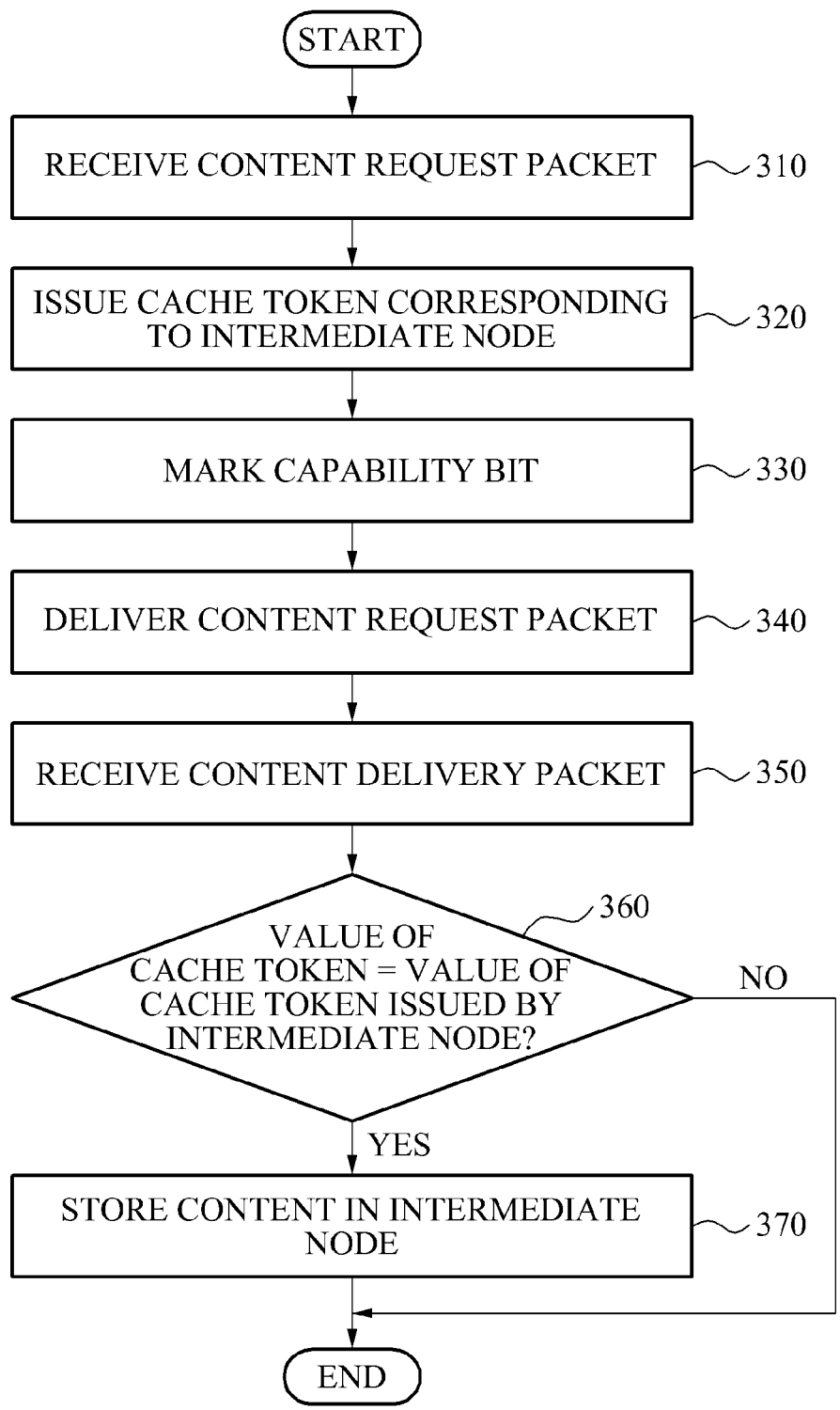
FIG. 3 is a flowchart illustrating an example of a communication method of an intermediate node of one or more intermediate nodes in a CCN.

FIG. 3 is a flowchart illustrating an example of a communication method of an intermediate node of one or more intermediate nodes in a CCN, the CCN including a content requester, the intermediate nodes, and a content owner. Referring to FIG. 3, the intermediate node receives (310) a content request packet from a content requester.

The intermediate node issues (320) a cache token corresponding to the intermediate node by changing a value of a cache token of the content request packet. For example, if the value of the cache token of the content request packet corresponds to "2", and a location of the intermediate node corresponds to a second position adjacent to the content requester, the intermediate node issues the cache token corresponding to the intermediate node by changing the value of the cache token of the content request packet to "3".

The content request packet may further include, in addition to the cache token, a name of content requested from the content owner, a segment of the content, and a capability bit. Here, the content request packet includes the capability bit, which corresponds to a bit used to indicate whether the intermediate node is capable of storing the corresponding content. However, as was described with respect to FIG. 1, the capability bit is not limited thereto.

The intermediate node marks (330) a capability bit included in the content request packet. For example, the intermediate node informs the content owner that the intermediate node is capable of storing content by marking the capability bit. Various example schemes of marking the capability bit are described below.

The intermediate node may mark the capability bit at a location corresponding to the intermediate node starting from a highest bit level or a lowest bit level of the capability bit. For example, it is presumed that the capability bit corresponds to "0000|0000|0000|0000", and the intermediate node is located at a fourth position adjacent to the content requester. In this instance, the intermediate node marks the capability bit, corresponding to the intermediate node, located at a fourth position adjacent to a highest bit level to be "0001|0000|0000|0000". The intermediate node marks the capability bit, corresponding to the intermediate node, located at a fourth position adjacent to a lowest bit level to be "0000|0000|0000|1000". The intermediate node marks a location corresponding to the intermediate node in the capability bit using a value expressed in the base-2 numeral system, the base-4 numeral system, the base-8 numeral system, the base-16 numeral system, or the like.

The intermediate node may mark the capability bit based on a frequency of the content being requested and storage space of an intermediate node. For example, it is presumed, among content A, content B, and content C, that a frequency of the content B being requested is relatively high at an intermediate node located at a third position adjacent to the content requester, and a frequency of the content A being requested is relatively high at an intermediate node located at a fourth position adjacent to the content requester. Further, it is presumed that content requested, through the content request packet, by the content requester in the CCN corresponds to the content B, and an intermediate node located at a third position adjacent to the content requester has sufficient storage space. In this instance, the intermediate node located at a third position adjacent to the content requester marks the capability bit when a frequency of the content B being requested is relatively high at the intermediate node, or when the intermediate node has sufficient storage space. The content owner may cause the intermediate node located at a third position adjacent to the content requester to store the content B with reference to the capability bit.

The intermediate node may mark the capability bit based on whether an adjacent node of the intermediate node marks the capability bit. For example, when the intermediate node corresponds to an intermediate node located at a third position adjacent to the content requester, and an intermediate node, corresponding to an adjacent node of the intermediate node, located at a second position adjacent to the content requester marks the capability bit to be "0000|0000|0000|0010", the intermediate node marks the capability bit corresponding to a location of the intermediate node with reference to the adjacent node. Thus, an ultimate capability bit corresponds to "0000|0000|0000|0110".

The intermediate node delivers (340) the content request packet to another intermediate node or the content owner. Thereafter, the intermediate node receives (350), from the content owner, a content delivery packet including content requested by the content requester and a cache token. As described in the foregoing, the cache token is used to determine content requested by the content requester and one or more of the intermediate nodes in which to store content that the content requester requests from the content owner. For example, the cache token may be used by the content owner to determine the one or more of the intermediate nodes in which to store the content requested from the content owner.

The intermediate node determines (360) whether a value of the cache token of the received content delivery packet equals the value of the cache token issued by the intermediate node. When the value of the cache token of the received content delivery packet is determined to be equal to the value of the cache token corresponding to the intermediate node, the intermediate node stores (370) the content therein. When the value of the cache token of the received content delivery packet is determined not to be equal to the value of the cache token corresponding to the intermediate node, the intermediate node does not store the content, and delivers the content to a subsequent one of the intermediate nodes or the content requester.

Figures 4, 5:
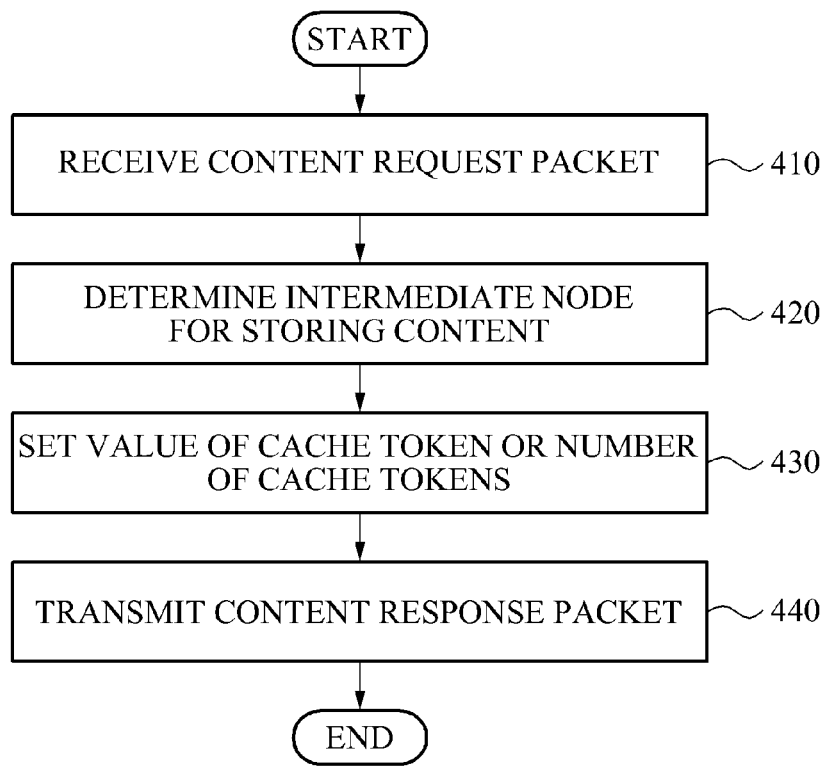
FIG. 4 is a flowchart illustrating an example of a communication method of a content owner in a CCN.
FIG. 5 is a diagram illustrating an example of components included in a content request packet.

FIG. 4 is a flowchart illustrating an example of a communication method of a content owner in a CCN, the CCN including a content requester, one or more intermediate nodes, and the content owner. Referring to FIG. 4, the content owner receives (410) a content request packet including a name of content requested by the content requester.

The content owner determines (420) an intermediate node of one or more intermediate nodes to store the requested content. The content owner may determine the intermediate node to store the content based on a capability bit of the content request packet. The content owner may determine the intermediate node to store the content based on a value of a cache token of the content request packet.

When the content owner determines the intermediate node to store the content based on the value of the cache token of the content request packet, the content owner may identify an intermediate node adjacent to the content requester based on a value of the cache token of the content request packet, and determine the intermediate node adjacent to the content requester to be an intermediate node for storing the content. For example, when a value of the cache token of the content request packet corresponds to "7", the content owner determines intermediate nodes located at a first or second position adjacent to the content requester to be intermediate nodes among seven intermediate nodes to store the content. That is, intermediate nodes having "2" or "3" as the value of the cache token are determined to be the intermediate nodes to store the content.

The content owner determines the intermediate node to store the content based on a network route through which the content request packet is transmitted, a characteristic of the content, a size of the content, a frequency of the content being requested, storage space of the intermediate nodes, or any combination thereof.

The content owner may make use of an intermediate node to store the requested content at a relatively distant location from the content requester or through a different network route depending on a characteristic or a type of the content, such as, for example, correspondence of the content to a music file, a movie file, a text file, or the like. The content owner may make use of an intermediate node to store the requested content at a relatively close location when the corresponding content has a relatively large size or is requested relatively frequently. The content owner may make use of an intermediate node to store the requested content at a relatively distant location when the corresponding content has a relatively small size or is requested less frequently.

The content owner may make use of one or more of the intermediate nodes having sufficient storage space to store corresponding content. In this instance, verification of whether an intermediate node has sufficient storage space or whether a frequency of the corresponding content being requested is high is performed using the capability bit of the content request packet.

When the content requester the intermediate node to store the requested content has a plurality of network routes, the content owner determines the intermediate node to store the requested content based on a characteristic (or type) of content. In this instance, the content owner may make use of intermediate nodes, in which each content is stored, to be located at different routes based on a characteristic (or type) of content. A communication method for a case of having a plurality of network routes in the CCN will be described with reference to FIG. 6.

In 430, the content owner sets a value of the cache token used to determine an intermediate node to store the requested content, a number of cache tokens, or a combination thereof.

The content owner transmits (440), to the content requester and the intermediate node to store the content, a content delivery packet including content and a cache token used to determine the intermediate node to store the content.

FIG. 5 is a diagram illustrating an example of components included in a content request packet. Referring to FIG. 5, the content request packet includes a content prefix 510, a segment 520 of content, a cache token 530, and a capability bit 540.

The content prefix 510 corresponds to a content name used to search for the corresponding content in a CCN, but is not limited thereto. Referring to FIG. 5, the content prefix 510 indicates desired content corresponding to "earthquake" included in a directory "news" of "naver.com".

The segment 520 indicates an order of a segment corresponding to desired content when content includes a plurality of segments. The cache token 530 is used to determine an intermediate node in which to store content as described in the foregoing. The capability bit 540 is used for an intermediate node or the like to inform a content owner that the intermediate node is able to store content.

A content requester initializes a value of the cache token 530 when generating a content request packet. An intermediate node issues a cache token of the intermediate node by increasing or decreasing a value of the cache token 530. Thus, while content is being delivered, an intermediate node having a cache token coinciding with a cache token issued by the content owner stores content.

When an intermediate node desires to store content, the intermediate node marks the capability bit 540 of the content request packet to indicate a desire to store content. In this instance, the intermediate node may mark a capability bit of the content request packet corresponding to an order of the intermediate node starting from a highest level bit or a lowest level bit of the capability bit 540. As a result, the content owner makes use of an intermediate node that marks the capability bit 540 of the content request packet to store content. The content owner may subsequently not store corresponding content in other intermediate nodes.

Figure 6:
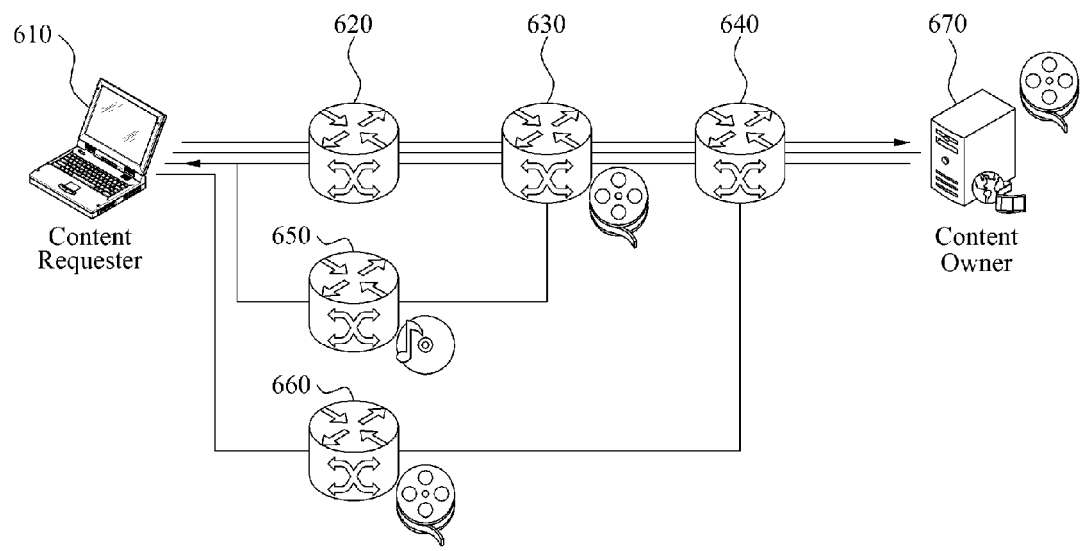
FIG. 6 is a diagram illustrating an example of dispersive storing being performed using a cache token in multiple routes.

FIG. 6 is a diagram illustrating an example of dispersive storing being performed using a cache token in multiple routes. Referring to FIG. 6, a CCN includes a content requester 610, intermediate nodes 620, 630, 640, 650, and 660, and a content owner 670. In this example, the content requester 610 requests the content owner 670 for a music file and a movie file.

The content requester 610 is connected to the content owner 670 by a plurality of routes. One or more of the intermediate nodes 620, 630, 640, 650, and 660 are connected to the content requester 610 by a plurality of routes. When the content owner 670 has a plurality of routes connected to the content requester 610, the content owner 670 may transmit content using a route through which a content request is received, a different route from the route through which the content request is received, or different routes for different and/or multiple content types. By transmitting content using different routes, the content owner 670 supports dispersive storing of content in the CCN.

Referring to FIG. 6, when the content owner 670 has a plurality of routes, the content owner 670 may store content or segments of content at different locations. For example, the content owner 670 may store content or segments of content at a variety of intermediate nodes by selecting different routes for each content or segment of content based on a characteristic or type of the content or the segments of content.

When content is stored on a route of a network in the CCN, bandwidth of the network is generally used more effectively. However, the content owner 670 may disapprove of content being stored on the route of the network. Thus, when the content owner 670 disapproves of content being stored on the route of the network, the content owner 670 may prevent content of the content owner 670 from being stored on the route of the network by not issuing a cache token.

The content owner 670 stores a music file of the requested content in the intermediate node 650 and a movie file of the requested content in the intermediate node 630, which is on a route used to receive a content request packet, or the intermediate node 660, which is placed on a different route from the route used to receive a content request packet.

The intermediate nodes 620, 630, 640, 650, and 660 may control a lifetime of content stored in storage space of each of the intermediate nodes 620, 630, 640, 650, and 660 to be proportional to a frequency of requests from the content requester 610. The intermediate nodes 620, 630, 640, 650, and 660 may secure storage space of a network device by reducing a period to store the corresponding content when a frequency of requests for the corresponding content from the content requester 610 is relatively low.

Figure 7:
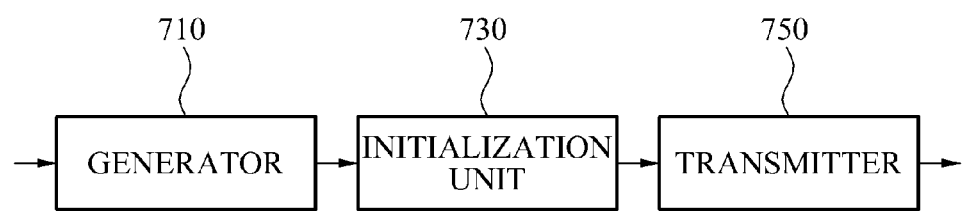
FIG. 7 is a block diagram illustrating an example of a content requester in a CCN.

FIG. 7 is a block diagram illustrating an example of a content requester 700 in a CCN. Referring to FIG. 7, a content requester 700 includes a generator 710, an initialization unit 730, and a transmitter 750. The generator 710 generates a content request packet including a cache token, the cache token being used to determine one or more intermediate nodes in which to store content requested from a content owner. The content request packet may further include a capability bit indicating whether the intermediate nodes are capable of storing the content. The initialization unit 730 initializes a value of the cache token in the generated content request packet. The transmitter 750 transmits the generated content request packet to the intermediate nodes and the content owner.

Figure 8:
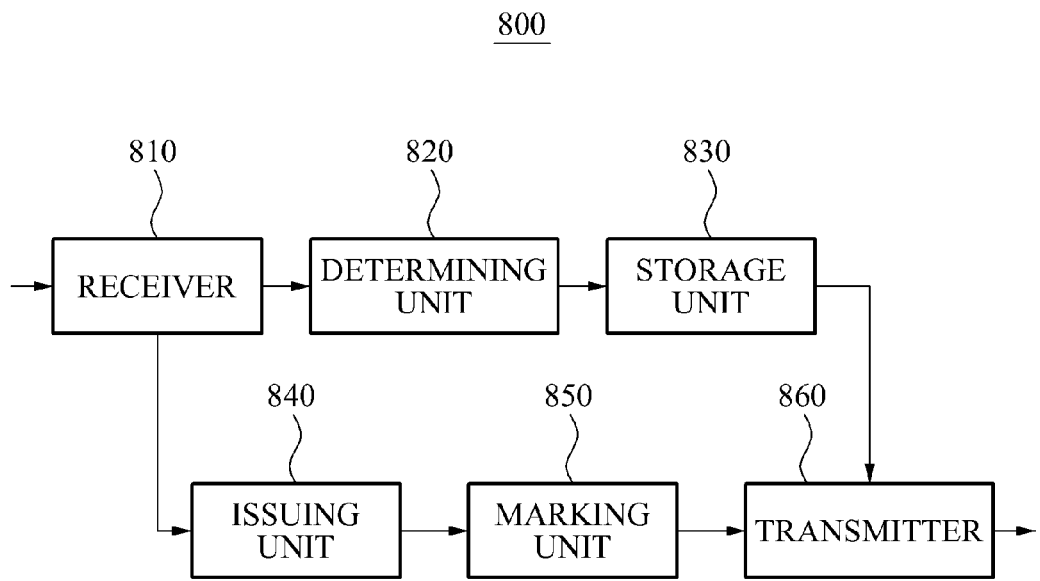
FIG. 8 is a block diagram illustrating an example of an intermediate node in a CCN.

FIG. 8 is a block diagram illustrating an example of an intermediate node 800 in a CCN. Referring to FIG. 8, an intermediate node 800 of one or more intermediate nodes includes a receiver 810, a determining unit 820, and a storage unit 830, an issuing unit 840, a marking unit 850, and a transmitter 860.

The receiver 810 receives, from a content owner, a content delivery packet including content requested by a content requester and a cache token, the cache token being used to determine one of more of the intermediate nodes in which to store the content. The receiver 810 receives a content request packet from the content requester. The content request packet includes the cache token of the content request packet, a name of the content, a segment of the content, and a capability bit indicating whether the one or more of the intermediate nodes are capable of storing the content.

The determining unit 820 determines whether a value of the cache token of the received content delivery packet equals a value of a cache token corresponding to the intermediate node. The storage unit 830 stores the content in the intermediate node based on a result of the determining. The issuing unit 840 issues the cache token corresponding to the intermediate node, the issuing of the cache token including changing a value of a cache token of the content request packet.

The marking unit 850 marks the capability bit. The marking unit 850 may mark the capability bit at a location corresponding to the intermediate node starting from a highest bit level or a lowest bit level of the capability bit. The marking unit 850 may mark the capability bit based on a frequency of the content and storage space of the intermediate node. The marking unit 850 may mark the capability bit based on whether an adjacent node of the intermediate node marks the capability bit.

The transmitter 860 transmits the content delivery packet, received from the content owner or another one of the intermediate nodes, to a subsequent intermediate node or the content requester. The transmitter 860 delivers the content request packet, received from the content requester or another one of the intermediate nodes and having the marked capability bit, to the content owner or a subsequent intermediate node.

Figure 9:
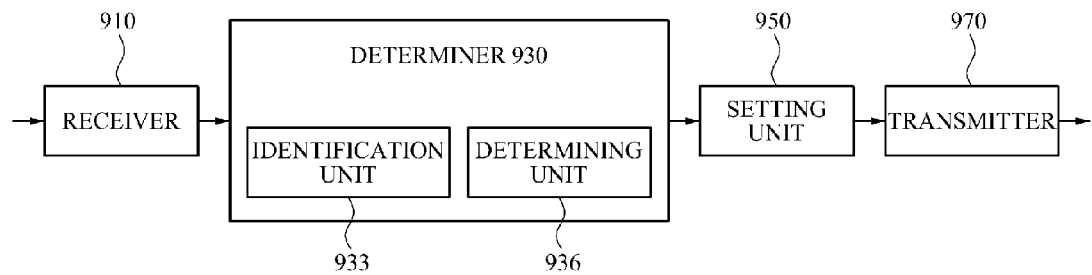
FIG. 9 is a block diagram illustrating an example of a content owner in a CCN.

FIG. 9 is a block diagram illustrating an example of a content owner 900 in a CCN. Referring to FIG. 9, a content owner 900 includes a receiver 910, a determiner 930, a setting unit 950, and a transmitter 970.

The receiver 910 receives a content request packet including a name of content requested by a content requester. The content request packet may include a cache token of the content request packet to determine one or more intermediate nodes in which to store the content, a segment of the content, a capability bit indicating whether the one or more of the intermediate nodes are capable of storing the content, or any combination thereof.

The determiner 930 determines one of the intermediate nodes to store the requested content. The determiner 930 may determine the one of the intermediate notes to store the requested content based on a capability bit of the content request packet or a value of the cache token of the content request packet.

For example, the determiner 930 identifies an intermediate node adjacent to the content requester based on a value of the cache token of the content request packet, and determines the intermediate node adjacent to the content requester to be the one of the intermediated nodes to store the requested content.

The determiner 930 may determine one of the intermediate notes to store the requested content based on a network route through which the content request packet is transmitted, a characteristic of the content, a size of the content, a frequency of the content being requested, storage space of the intermediate nodes, or any combination thereof.

The determiner 930 may include an identification unit 933 to identify an intermediate node adjacent to the content requester based on a value of the cache token of the content request packet, and a determining unit 936 to determine the intermediate node adjacent to the content requester to be the one of the intermediated nodes to store the requested content.

When the content requester or the one of the intermediate nodes has a plurality of network routes, the determiner 930 may determine the one of the intermediate nodes to store the requested content based on a characteristic of the requested content or a network route through which the content request packet is transmitted such that the one of the intermediate nodes is on a network route that is different from the network route through which the content request packet is transmitted.

The setting unit 950 sets a value of the cache token used to determine the one of the intermediate nodes to store the requested content, a number of cache tokens, or a combination thereof. The transmitter 970 transmits, to the content requester and the one of the intermediate nodes, a content delivery packet, the content delivery packet including the requested content, and a cache token used to determine the one of the intermediate nodes to store the content.

According to teachings above, by considering a state of network equipment in the CCN, such as, for example, a cache size, a condition of requesting content, a frequency of a request, or the like, it may be possible to store content at an optimal location on a route through which content is delivered by a content request packet.

According to teachings above, by dispersedly storing content according to a content request message at an optimal location on a route through which content is transmitted, it may be possible to reduce an amount of network usage without help from an external server or a manager, and promptly respond to a user request.

According to teachings above, by storing content at an appropriate location of a network route while a content responding procedure by a content request packet is proceeding, it may be possible to enhance a network caching effect and a rate of using stored content.

According to teachings above, by storing content at a location having relatively large content requests, it may be possible to minimize a usage route of a network, and reduce time needed to respond to a user request.

The units described herein may be implemented using hardware components, such as, for example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. In addition, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. In addition, the described unit to perform an operation or a method may be hardware, software, or some combination of hardware and software. For example, the unit may be a software package running on a computer or the computer on which that software is running.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a content requester node in a content centric network (CCN), the CCN comprising the content requester node, intermediate nodes, and a content owner node, the communication method comprising:
generating a content request packet comprising:
a request cache token generated by the content requester node, and
capability bits to be changed by the intermediate nodes and configured to indicate the intermediate nodes that are capable of storing content requested in the content request packet;
transmitting the generated content request packet to the intermediate nodes and the content owner; and
receiving a content delivery packet comprising:
the content requested by the content request packet, and
a delivery cache token generated by the content owner node, based on the capability bits, identifying an intermediate node of the intermediate nodes in which the content is stored.

2. The communication method of claim 1, further comprising:
initializing a value of the request cache token in the generated content request packet.

3. A non-transitory computer-readable medium comprising a program for instructing a computer to perform the method of claim 1.

4. A communication method of an intermediate node among intermediate nodes in a content centric network (CCN), the CCN comprising a content requester node, intermediate nodes, and a content owner node, the communication method comprising:
receiving a content request packet comprising:
a request cache token initiated by the content requester node, and
capability bits indicating whether the intermediate nodes are capable of storing a content;
issuing a modified request cache token corresponding to the intermediate node, the issuing of the modified request cache token comprising changing a value of the request cache token of the content request packet;
marking a capability bit among the capability bits of the content request packet indicating that the intermediate node is capable of storing the content requested in the content request packet;
receiving a content delivery packet comprising content requested by the content request packet and a delivery cache token, the delivery cache token generated by the content owner node based on the capability bits of the content request packet to identify one or more of the intermediate nodes in which the content is to be stored;

determining whether a value of the delivery cache token of the received content delivery packet equals the changed value of the request cache token;

storing the content in the intermediate node based on a result of the determining.

5. The communication method of claim 4, wherein, the intermediate node stores the content in response to the value of a delivery cache token of the received content delivery packet being determined to be equal to the value of the issued modified request cache token corresponding to the intermediate node, and wherein, the intermediate node transmits the content to a subsequent one of the intermediate nodes or the content requester in response to the value of the delivery cache token of the received content delivery packet being determined not to be equal to the value of the issued modified request cache token corresponding to the intermediate node.

6. The communication method of claim 4 wherein the changing of the value of the request cache token of the content request packet comprises increasing or decreasing the value of the request cache token of the content request packet.

7. The communication method of claim 4, further comprising:

changing the value of the request cache token received with the content request packet to a value identifying the intermediate node and transmitting the content request packet, with its changed request cache token value, to a next device in a communication path.

8. The communication method of claim 4, wherein the content request packet further comprises a name of the content, and a segment of the content.

9. The communication method of claim 4, wherein the capability bit among the capability bits is marked at a location corresponding to the intermediate node starting from a highest bit level or a lowest bit level of the capability bits.

10. The communication method of claim 9, wherein the capability bits are marked based on a frequency of the content and storage space of the intermediate node.

11. The communication method of claim 9, wherein the capability bits are marked based on whether an adjacent node of the intermediate node marks the capability bit.

12. The communication method of claim 9, further comprising:

delivering the content request packet having the marked capability bit to an other one of the intermediate nodes or the content owner.

13. A communication method of a content owner node in a content centric network (CCN), the CCN comprising a content requester node, intermediate nodes, and the content owner node, the communication method comprising:

receiving a content request packet comprising:

a modified request cache token initiated by the content requester node and updated by the intermediate nodes, said modified request cache token identifying the intermediate nodes, and capability bits indicating the intermediate nodes that are capable of storing content requested in the content request packet, the capability bits being updated by the intermediate nodes that are capable of storing the content requested in the content request packet;

determining, based on the modified request cache token and the capability bits, which of the intermediate nodes to store the requested content; and transmitting a content delivery packet comprising the requested content and at least one delivery cache token that indicates the intermediate nodes determined to store the content.

14. The communication method of claim 13, wherein the content request packet comprises a segment of the content.

15. The communication method of claim 13, further comprising:

setting a value of the delivery cache token used to determine the intermediate nodes to store the requested content, setting a value of a number of delivery cache tokens, or a combination thereof.

16. The communication method of claim 13, wherein one of the intermediate nodes to store the requested content is determined based on a capability bit of the content request packet.

17. The communication method of claim 13, wherein one of the intermediate nodes to store the requested content is determined based on a value of the modified request cache token of the content request packet.

18. The communication method of claim 13, wherein the determining comprises:

identifying an intermediate node adjacent to the content requester based on a value of the modified request cache token of the content request packet; and determining the identified intermediate node adjacent to the content requester to be one of the intermediate nodes to store the requested content.

19. The communication method of claim 13, wherein an intermediate node of the intermediate nodes to store the requested content is determined based on a network route through which the content request packet is transmitted, a characteristic of the content, a size of the content, a frequency of the content being requested, storage space of the intermediate nodes, or any combination thereof.

20. The communication method of claim 13, wherein, when the content requester or any of the intermediate nodes comprises a plurality of network routes, an intermediate node of the intermediate nodes to store the requested content is determined based on a characteristic of the requested content.

21. The communication method of claim 13, wherein, when the content requester or any of the intermediate nodes comprises a plurality of network routes, an intermediate node of the intermediate nodes to store the requested content is determined based on a network route through which the content request packet is transmitted such that the intermediate node is on a network route that is different from the network route through which the content request packet is transmitted.

* * * * *